G. L. LECLANCHÉ.
ELECTRICAL BATTERY WITH PRIMARY AND SECONDARY PILES COMBINED.
No. 64,113. Patented Apr. 23, 1867.
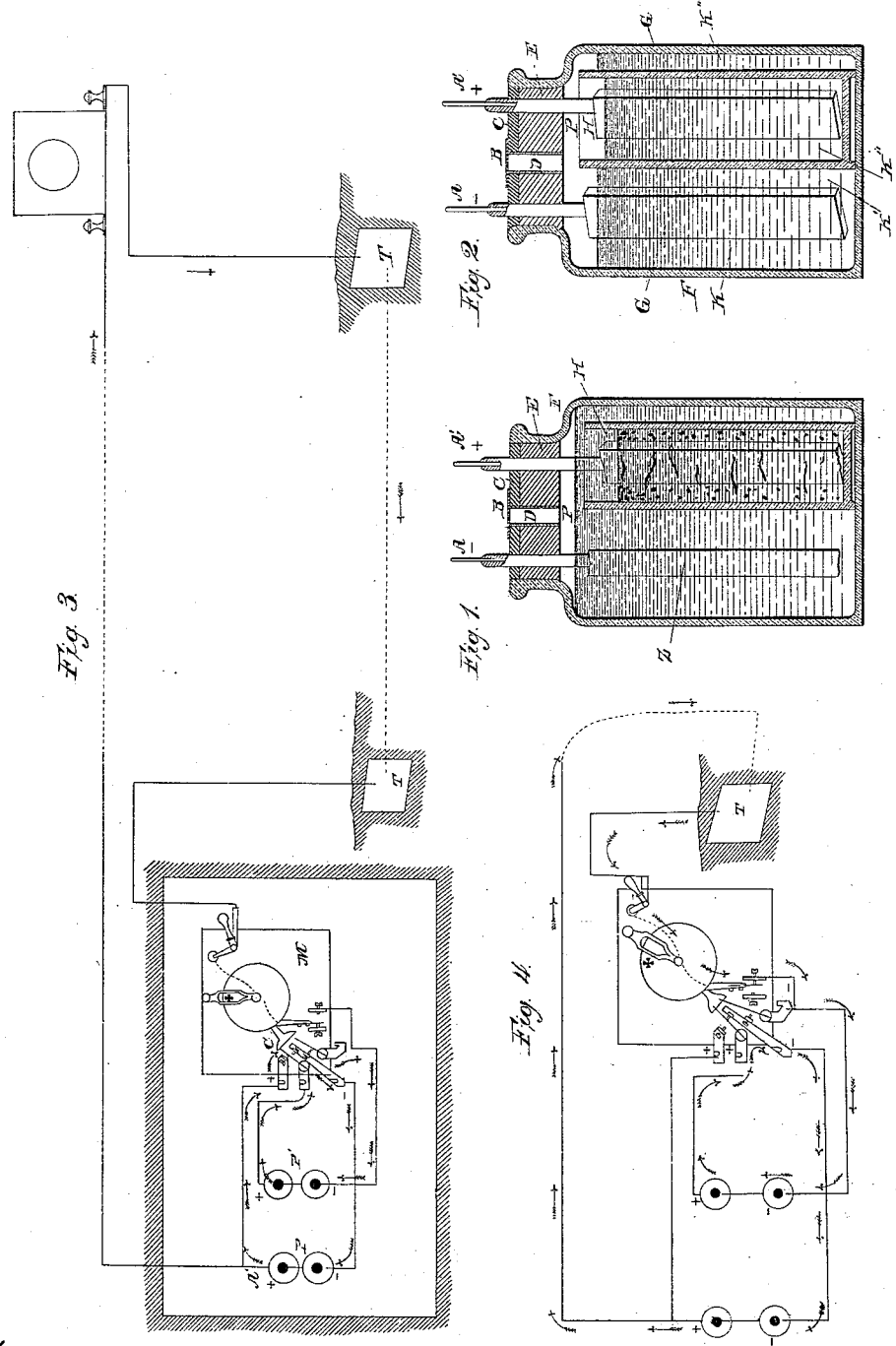
Witnesses.
S. B. Kidder.
M. W. Frothingham.
Inventor
G. L. Leclanché
by Crosby & Gould
Attorneys

United States Patent Office.

GEORGES LIONEL LECLANCHÉ, OF PARIS, FRANCE.

Letters Patent No. 64,113, dated April 23, 1867.

---

IMPROVEMENT IN COMBINING GENERATING AND SECONDARY OR ACCUMULATING GALVANIC BATTERY.

---

*The Schedule referred to in these Letters Patent and making part of the same.*

---

TO ALL WHOM IT MAY CONCERN:

Be it known that I, GEORGES LIONEL LECLANCHÉ, of Paris, in the Empire of France, have invented certain "Improvements in Electrical Apparatus;" and I do hereby declare that the following, taken in connection with the drawings which accompany and form part of this specification, is a description of my invention sufficient to enable those skilled in the art to practise it.

In piles where sulphates of mercury, copper, and even lead, are made use of, the metallic salts destined to depolarize the positive plate are always more or less soluble, and this solubility is a permanent cause of wear to the negative metal, and necessitates continual addition. In my new apparatus I have had in view the following results: first, absolute insolubility of the depolarizing substance, which condition is so essential that without it any or every element of pile must sooner or later become unserviceable, whether at work or at rest; secondly, a considerable reduction in the number of cells necessary for working any given electro-motor. My invention will be described as embodied, first, with an electrical generator, and, secondly, with an electrical accumulator.

For the generator I take a flask with a large neck, into which I introduce a porous vase for receiving a plate of carbon or graphite, (such as is obtained from the lining of gas retorts,) to which I attach a metallic wire, acting as the positive pole, and I fill this vase with peroxide of manganese, reduced to powder, or preferably with a mixture of peroxide of manganese and powdered graphite. I then fill up the flask with sand or saw-dust, or, in a word, any granulated substance which will thicken the water, and I place in the same a disk or plate of zinc, provided with a metallic wire acting as the negative pole. The entire mass of sand and peroxide of manganese is then moistened with a concentrated solution of chloro-hydrate of ammonia. The conducting wires are passed through holes made in the cork or bung which closes the neck of the flask, and in the centre of the said cork I make a third hole, into which I insert a small glass tube. When the flask is thus closed and free from leakage, it can be sealed in the usual manner. When the wax is completely hardened, I cut off the glass tube level with the flask, and I cover the hole with a small sheet of India rubber stuck to the wax. When the flask is thus closed, I make a clean cut in the India rubber, just over the tube, which cut acts as a valve, that allows the escape of gases, if requisite, whilst it intercepts the liquid, even though the flask be turned over. In this manner a pile can be transported in any manner from place to place, without any of the liquid therein contained escaping. The electrical generator is thus composed of one or more elements of piles, according to the electrical power required. It is, however, evident that the pile would work equally well if it were not closed, but simply arranged in the ordinary manner of the "Daniel" piles.

The polarization apparatus or electrical accumulator of which I make use, is composed of two flasks, in which are placed two plates of graphite, or two plates of unoxidable metal. These two plates are buried in powdered graphite, (a good conductor of electricity,) and moistened with a liquid, which is an equally good conductor, such as potash water, for instance. In order to obtain energetic effects, as well as for the convenience of the construction, it is well to separate the poles, that is to say, the two plates of graphite and its powdered graphite, by means of a diaphragm of a porous nature. With an apparatus thus constructed and applied to any pile, the following result is obtained: If I cause the current of the pile to be passed during a certain length of time through the accumulator, and then disconnect the pile, by uniting the two graphites, a current is obtained which acts in the opposite direction of the pile of which I have made use. This property arises from the well-known physical fact that where the current of any pile is passed for a certain length of time through an electrolyte by means of two platina plates or wires, these two bodies which have served to transmit the current have acquired a particular property which can be rendered perceptible by placing a galvanometer in the stead of the pile. An electrical current is thus obtained which is always opposed to that of the pile made use of. This fact is expressed by stating that the plates or bodies are "polarized," which signifies that the seat of the electrical forces is placed on them. This property, which has been recorded some years back, has not received much attention, and it has never been supposed that a strong electrical current could be thus obtained susceptible of many applications; but as I have above stated, as the current which the accumulator is capable of furnishing is in opposition to that of the pile, in order to make use of all the actions of the current in the applications above mentioned, it becomes necessary to make use of a self-acting commutator.

To give a clear idea of these applications, I annex to the present description a drawing representing the application of my accumulator or polarizer to a transmitting telegraphic apparatus. With this apparatus I diminish to a considerable extent the number of piles necessary for transmitting dispatches.

Figure 1 represents the electrical generator, in which A is the zinc or negative pole; A' the graphite or positive pole; B the little India-rubber valve; C the wax; D the glass tube; E the cork; F the flask; G the graphite plate; H the porous vase, containing a mixture of peroxide of manganese and chloro-hydrate of ammonia; Z the zinc disk, and P the liquid, containing a solution of chloro-hydrate of ammonia, which, in case it is desired to transport the pile, is charged with saw-dust or sand.

Figure 2 represents the accumulator, in which A and A' are the two poles; G and G' the two plates of graphite; K K' K'' K''' powdered charcoal moistened with a good conducting liquid, such as potash water, for instance; F the flask; H the porous vase; D the glass tube; E the cork; B the valve, and C the wax.

Figure 3 represents my system complete, with the pile polarizing the accumulator, in which case the apparatus is said to be "in quantity."

Figure 4 represents the position of the system when it is utilizing the current of polarization. The apparatus is then said to be "in tension." M is the manipulator; P the pile or generator; P' the accumulator or polarizer; C the commutator, which I do not describe as to its detailed construction, as that can be varied according to circumstances.

My apparatus is composed, as I have stated, first of a series of piles, and secondly of an electrical accumulator. The elements of the piles can either be arranged "in tension" or "in quantity," and in all cases the two poles terminating the batteries are placed in communication with the two wires which constitute the poles of the electrical accumulator. An apparatus is thus obtained which can be applied to every kind of telegraphic systems, and generally to all kinds of electrical motors. My invention may be said to consist, therefore, in the use in electrical piles of peroxide of manganese, moistened with a liquid containing a salt in solution, which has no chemical action on the peroxide of manganese, the salt used being capable, by its electrolytical decomposition, of rendering soluble the oxides of manganese arising from the reduction operated by the hydrogen. The salt which has given me the best results is chloro-hydrate of ammonia. I must nevertheless acknowledge that all salts with an ammoniacal basis will also give good results. It also consists in the application of the polarization by means of an apparatus such as above described, which can be applied to every description of pile.

I claim, in combination, the graphite plate or plates, the flask and the porous vase, the flask and vase being charged, and the whole apparatus being arranged to operate substantially as set forth.

I also claim the employment in electrical piles of peroxide of manganese, moistened with a liquid containing a salt in solution, which has no chemical action on the peroxide of manganese, the salt used being capable, by its electrolytical decomposition, of rendering soluble the oxides of manganese arising from the reduction operated by the hydrogen.

GEORGES LIONEL LECLANCHE.

Witnesses:
D. H. BRANDON,
A. H. BRANDON, 13 *Rue Gaillon, Paris*.